United States Patent [19]

Uozumi

[11] 4,265,180

[45] May 5, 1981

[54] STEERING MEANS FOR GUIDED VEHICLES

[75] Inventor: Yukio Uozumi, Kobe, Japan

[73] Assignee: Kawasaki Jukogyo Kabushiki Kaisha, Kobe, Japan

[21] Appl. No.: 15,667

[22] Filed: Feb. 27, 1979

[30] Foreign Application Priority Data

Mar. 1, 1978 [JP] Japan .............................. 53-22920

[51] Int. Cl.³ .......................... B61B 13/00; B61F 9/00
[52] U.S. Cl. .................................... 104/247; 104/119; 105/144; 280/89; 74/522
[58] Field of Search ............ 104/118, 119, 242, 244.1, 104/245, 247; 180/79, 131; 105/141, 144; 280/89, 445, 448, DIG. 14, 94 R; 74/522

[56] References Cited

U.S. PATENT DOCUMENTS

| | | | |
|---|---|---|---|
| 966,750 | 8/1910 | Hunt | 180/79 |
| 1,896,292 | 2/1933 | Dorn | 280/89 |
| 3,643,601 | 2/1972 | Taylor et al. | 104/119 X |
| 3,796,165 | 3/1974 | Goode | 104/247 |
| 3,858,523 | 1/1975 | Allsup, Jr. | 180/79 X |

FOREIGN PATENT DOCUMENTS

| | | | |
|---|---|---|---|
| 2641637 | 3/1978 | Fed. Rep. of Germany | 104/247 |
| 2807984 | 8/1978 | Fed. Rep. of Germany | 104/119 |
| 2746462 | 4/1979 | Fed. Rep. of Germany | 180/79 |

*Primary Examiner*—Randolph A. Reese
*Attorney, Agent, or Firm*—Fleit & Jacobson

[57] ABSTRACT

A guided vehicle including at each end portion of the body a pair of steerable running wheels adapted to run on track surfaces and a pair of guide wheels adapted to run along guide rails provided at the opposite sides of the track surfaces. A steering linkage is provided for connecting the running and guide wheels so that the former is steered in response to a transverse movement of the latter. A friction type restraining device is provided in the linkage so that the steering movement is not produced by a small amount of surface roughness in the guide rail.

11 Claims, 17 Drawing Figures

STEERING MEANS FOR GUIDED VEHICLES

The present invention relates to guided vehicle systems including vehicles adapted to be guided and run along guide rails. More particularly, the present invention pertains to steering means for guided vehicles having steerable running wheels which are provided adjacent to respective ends of vehicle bodies and guide wheels which are also provided adjacent to respective ends of the vehicle bodies and adapted to run along guide rails so that the running wheels are steered in response to transverse movements of the guide wheels.

In guided vehicle systems having rubber-tired steerable running wheels and guide wheels adapted to run along guide rails, it has been required in order to avoid steering instability to have the guide wheels of a relatively rigid construction such as solid rubber tire construction. However, in this type of vehicle system, problems have been encountered in that even small amounts of surface irregularities in the order, for example, of 1 to 2 mm on the guide rails may cause steering forces in the order of 100 to 200 kg resulting in steering movements of the running wheels. Such repeated steering movements cause corresponding transverse movements of the vehicles which will give uncomfortable feelings to passengers and decrease the life of wheel tires.

It is therefore an object of the present invention to provide guided vehicle systems with steering means which can substantially prevent any impact loads caused by the surface irregularities on the guide rails from being transmitted to the vehicle bodies and can provide stable steering movements with comfortable feelings even under a high speed operation.

Another object of the present invention is to provide guided vehicle systems with steering means which provides stable steering functions under either forward or rearward operations.

A further object of the present invention is to provide steering means for guided vehicle systems including simple switching means for accommodating the steering means to either of the forward or rearward vehicle operations.

Still further object of the present invention is to provide steering means for guided vehicle systems which has movable parts of small mass and includes lever mechanisms that are advantageous for providing improved dynamic properties of the steering means.

A further object of the present invention is to provide guided vehicles systems with steering means in which switching can be performed without any problem even in curved tracks for accommodating the steering means to forward and rearward vehicle operations.

Yet further object of the present invention is to provide steering means for guided vehicle systems which can maintain predetermined positions in stable manners even when there are troubles in pneumatic systems of the vehicles.

In order to accomplish the above and other objects, the present invention proposes to provide steering mechanisms of the running wheels at portions where displacements are produced as results of steering movements, with restraining mechanisms which produce Coulomb frictional resistances to the displacements or hydraulic means which provides resistances which are similar in effect to Coulomb frictions, whereby the steering movements of the running wheels are not produced until the steering forces from the guide wheels are increased beyond a predetermined value. The guide wheels are of relatively flexible construction so that small amounts of surface irregularities in the order of, for example, a few millimeters are absorbed by deformations of the guide wheels but do not produce steering forces sufficient to cause the steering movements of the running wheels. The guide wheels may be connected with the running wheels through pure mechanical elements including pins, rods and levers so that the steering forces exceeding the resistance forces in the restraining mechanisms can be transmitted without delay to the running wheels to provide improved stability even with simple mechanisms.

In order to accommodate the guided vehicles to wide varieties of purposes, it is usually required that the vehicle can be operated both in the forward and rearward directions, preferably with the same performance in the both directions. In the vehicles in accordance with the present invention, since the running wheels and the guide wheels are provided adjacent to respective ends of the vehicle bodies, switching means are required in the steering means in order to meet the above requirement. According to the present invention, the switching means is provided in the form of means for reversing the lever actions in the steering mechanisms.

According to a further feature of the present invention, use is made of a special lever means to provide the aforementioned switch means which is simple in structure and has movable parts of relatively small mass. Further, yieldable actuator means such as penumatic means or electric motor means is adopted in the switching means so that the switching can be effected even in curved tracks with relatively small forces. Describing in more detail, where the vehicle is stopped on a curved track and it is desired to switch the steering mechanisms from the forward proceeding positions to the reversing positions or vice versa, the running wheels have to be applied with forces for turning them about vertical axes.

Where the curvature of the track is moderate, such turning forces may be absorbed in the form of resilient deformations of the wheel tires even in conventional steering arrangement. However, where the track curvature is of a substantially small radius, the tire treads may have to be slipped, as the results of the switching, with respect to the track surfaces so that substantial turning forces are required to effect the switching. According to the aforementioned feature of the present invention, due to the existence of the yieldable actuator means such as the pneumatic means or electric motor means in the steering mechanisms, the turning forces can be absorbed by the actuator means without producing any slipping movements between the tire treads of the running wheels and the track surfaces. As the vehicle is thereafter moved along the track, the running wheels are turned about the vertical axes under the action of the actuator means to complete the switching movement.

The above and other objects and features of the present invention will become apparent from the following descriptions of preferred embodiments taking reference to the accompanying drawings, in which.

Figure 1:
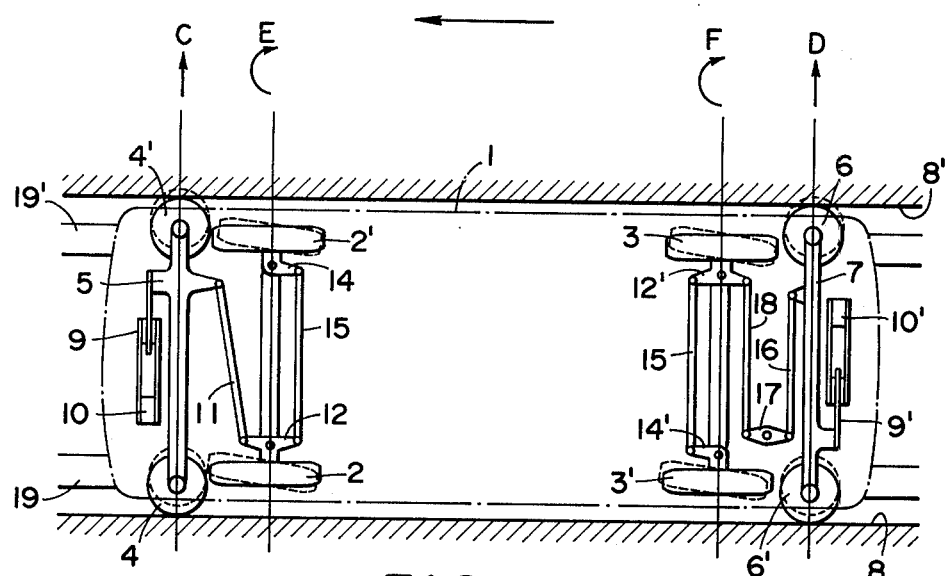
FIG. 1 is a diagrammatical plan view showing steering mechanisms for a guided vehicle in accordance with one embodiment of the present invention.

Referring now to the drawings, particularly to FIG. 1, there is shown a guided vehicle to which the present invention can be applied. The vehicle includes a body 1 which is carried by steerable front running wheels 2 and 2' and steerable rear running wheels 3 and 3'. At the front end portion of the body 1, there are provided guide wheels 4 and 4' which are associated with the front running wheels 2 and 2'. The guide wheels 4 and 4' are connected together by means of a transversely extending beam 5 to constitute a front guide wheel mechanism. Similary, a rear guide wheel mechanism is provided by guide wheels 6 and 6'and a beam 7.

Figure 2:
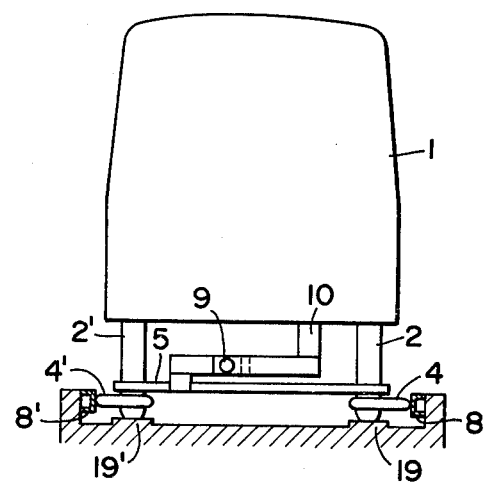
FIG. 2 is a front view of the vehicle shown in FIG. 1.

The vehicle is adapted to run along a track which includes, as shown in FIG. 2, a pair of parallel running surfaces 19 and 19' and a pair of guide rails 8 and 8' provided at the outward sides of the running surfaces 19 and 19'. The running wheels 2, 2' and 3, 3' are adapted to run on the surfaces 19 and 19', while the guide wheels 4, 4' and 6, 6' are adapted to roll along the guide rails 8 and 8'.

Between the body 1 and the guide wheel beams 5 and 7, there are respectively provided restraining devices 9 and 9' which are connected at one of their ends with the body 1 through brackets 10 and 10', respectively. The other ends of the retraining devices 9 and 9' are connected with the beams 5 and 7, respectively. The front running wheel 2 has a steering arm 12 which is attached thereto and in turn connected through a tie rod 15 with a steering arm 14 provided on the front wheel 2' so that the both wheels 2 and 2' are steered in the same direction by substantially the same angle. The steering arm 12 is further connected through a steering rod 11 with the beam 5 whereby the running wheels 2 and 2' are simultaneously steered in response to an axial movement of the beam 5.

At the rear portion of the vehicle, the running wheel 3 is provided with a steering arm 12' which is connected with the beam 7 through steering rods 16 and 18 and a reversing lever 17 interposed between the steering rods 16 and 18. The running wheel 3' has a steering arm 14' which is connected through a tie rod 15 with the steering arm 12' on the wheel 3, so that the wheels 3 and 3' can be steered simultaneously. As shown in FIG. 1, the displacements of the guide wheels 4, 4' and 6, 6' in the directions shown by arrows C and D produce steering movements of the running wheels 2, 2' and 3, 3' in the directions shown by arrows E and F.

Figure 3:
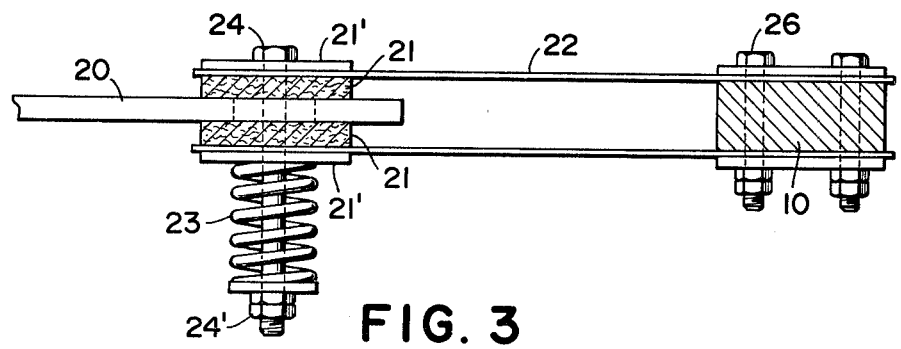
FIG. 3 is a sectional view showing one embodiment of the friction type restraining means which can be used in the steering mechanism in accordance with the present invention.

FIG. 3 shows the detailed structure of the restraining device 9. As shown, the device 9 includes a slidable plate 20 disposed between a pair of friction pads 21 which may be made of asbestos molded with a resinous binder. Each of the friction pads 21 is attached at its outer surface with one end of a connecting plate 22 and a holding plate 21' is disposed on the outer surface of the plate 22. A bolt 24 extends from one side through the plates 21' and 22 and the friction pads 21 to the other side with a compression spring 23 disposed between one of the holding plates 21' and a retaining nut 24'. In this manner, the friction pads 21 are maintained in pressure contact with the opposite sides of the slidable plate 20. The other ends of the connecting plates 22 are connected with the bracket 10, while the slidable plate 20 is connected with the beam 5. The connecting plates 22 are flexible in the direction of the action of the spring 23 so that the deflections of the plates 22 do not have any noticeable effect on the pressure between the plate 20 and the pads 21. It will therefore be understood that the maximum frictional force between the plate 20 and the pads 21 can be substantially determined by the initial load of the spring 23.

Figure 4:
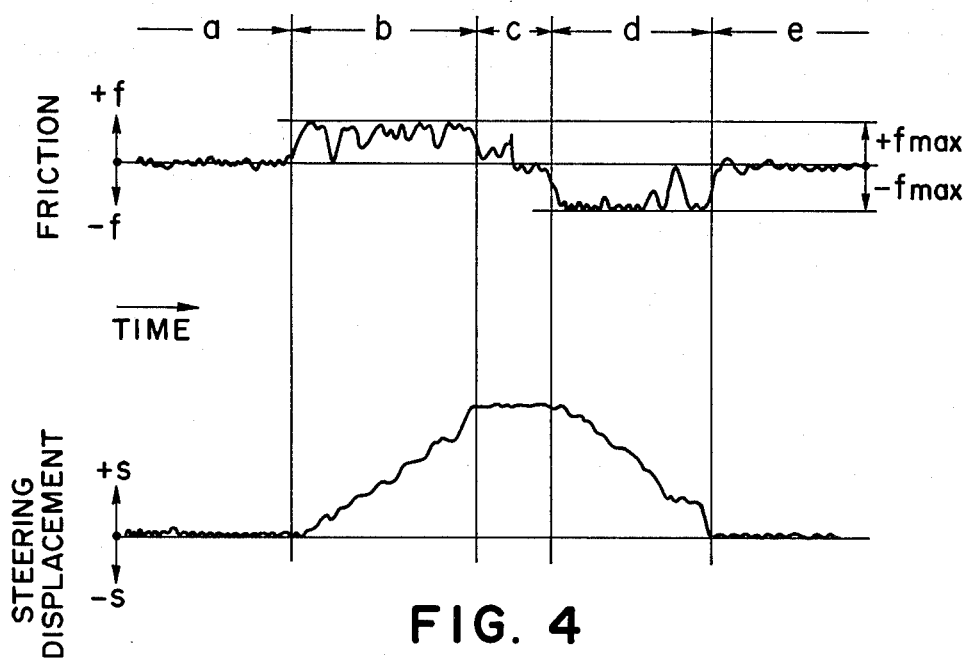
FIG. 4 is a diagram showing the frictional force as produced in the restraining means when the vehicle is passing through a curved track.

Referring now to FIG. 4 which shows the function of the restraining device of the aforementioned type, it will be noted that as the vehicle proceeds from a straight path a to a transient curvature path b, the frictional force in the restraining device is increased to the value $+f_{max}$ and the plate 20 is finally moved with respect to the friction pads 21 overcoming the frictional force therebetween. Thus, the beam 5 is moved with respect to the car body 1 to produce a steering movement. As long as the steering movement is continued, the frictional force is maintained substantially at the maximum value. As the vehicle the proceeds to a circular path c, the running wheels 2 and 2' are maintained at the steered positions. The vehicle is thereafter proceeded from the circular path c to a transient path d so that the running wheels 2 and 2' are gradually returned from the steered positions to the normal positions. In this instance, the frictional force between the plate 20 and the friction pads 21 is maintained at the maximum value $-f_{max}$. Similar operations are also produced in the steering mechanism at the rear end portion of the vehicle.

In the illustrated arrangement, as long as the frictional force between the slidable plate 20 and the friction pads 21 is smaller than the value $f_{max}$, no slippage is produced between these members so that the beam 5 or 7 is maintained stationary. In this instance, any loads applied to the guide wheels 4 and 4' due for example to the existence of surface irregularities on the guide rails 8 and 8' are absorbed through deformations of the guide wheels 4 and 4'. Thus, according to the present invention, relatively flexible tires are used as the guide wheels.

Figure 5:
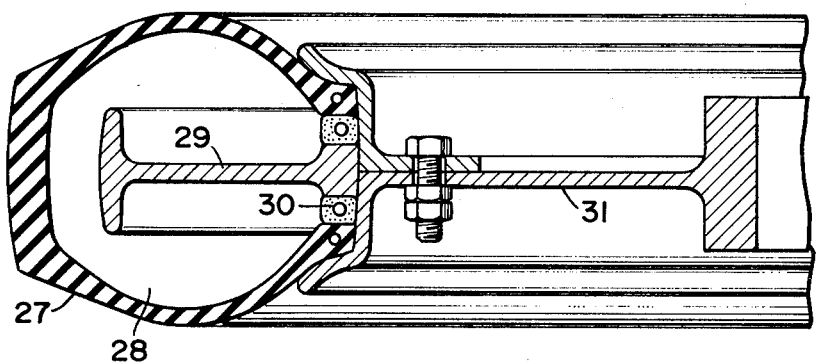
FIG. 5 is a fragmentary sectional view showing an example of the guide wheel which can be used in the vehicle of the present invention.

Referring to FIG. 5, there is shown one example of a gas-inflated tire construction which is suitable for use as the guide wheel in the present invention. The wheel assembly shown in FIG. 5 has a tube-less tire 27 of which hollow interior 28 is filled with compressed air or nitrogen. The tire 27 is mounted on a wheel casting 31 by means of retaining rings 30. In order to avoid excessive deformation of the tire 27 which may cause adverse effects on the steering characteristics, a metallic ring 29 is disposed in the tire 27. The ring 29 may be of four piece construction and is secured to the wheel casting 31.

Figure 6:
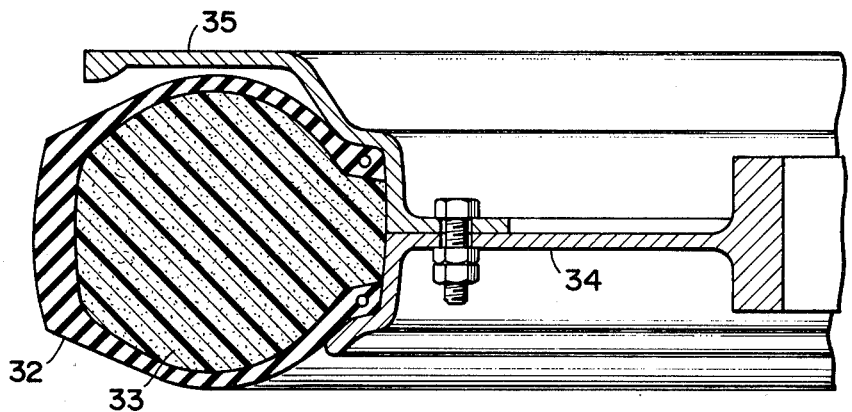
FIG. 6 is a fragmentary sectional view showing another example of the guide wheel.

FIG. 6 shows another example of the guide wheel assembly in which a rubber tire 32 is filled with flexible resilient material 33 such as soft urethane or foamed latex. The rubber tire 32 is secured to a wheel casting 34. In order to prevent excessive deformation of the tire 32, the wheel casting is formed with an auxiliary wheel 35 which is positioned at one side of the tire.

Figure 7:
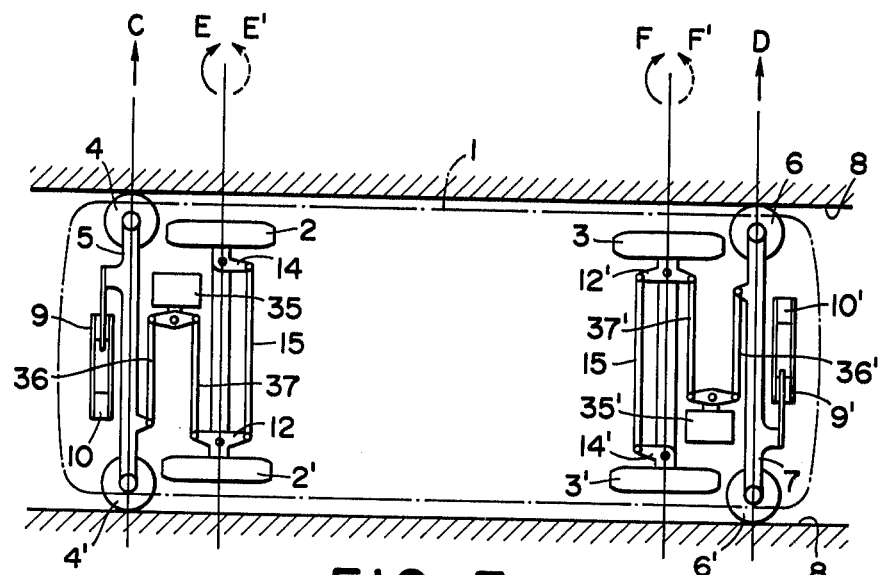
FIG. 7 is a diagrammatical plane view showing the steering mechanisms for a guided vehicle in accordance with another embodiment of the present invention.

Referring now to FIG. 7, there is shown a further embodiment in which the present invention is applied to a guided vehicle which can proceed in either of the opposite directions. The steering mechanisms in this embodiment are different from those in the previous embodiment in respect to the connections between the guide wheel beams and the steering arms on the running wheels. In the embodiment of FIG. 7, the single steering rod 11 in the previous embodiment is substituted by steering rods 36 and 37 and a switching mechanism at the front end portion of the vehicle. At the rear end portion, the reversing lever 17 and the steering rods 16 and 18 in the previous embodiment are substituted by a switching mechanism 35' and steering rods 36' and 37'.

When the vehicle is running towards left as seen in the plane of FIG. 7, it is required that the switching mechanism 35 functions to transmit the steering movement of the steering rod 36 in the same direction to the rod 37. At the opposite end, however, the switching mechanism 35' functions to transmit the movement of the steering rod 36' in the opposite direction to the rod 37'. When the vehicle proceeds toward right, the switching mechanisms 35 and 35' function in the opposite ways.

Figure 8:
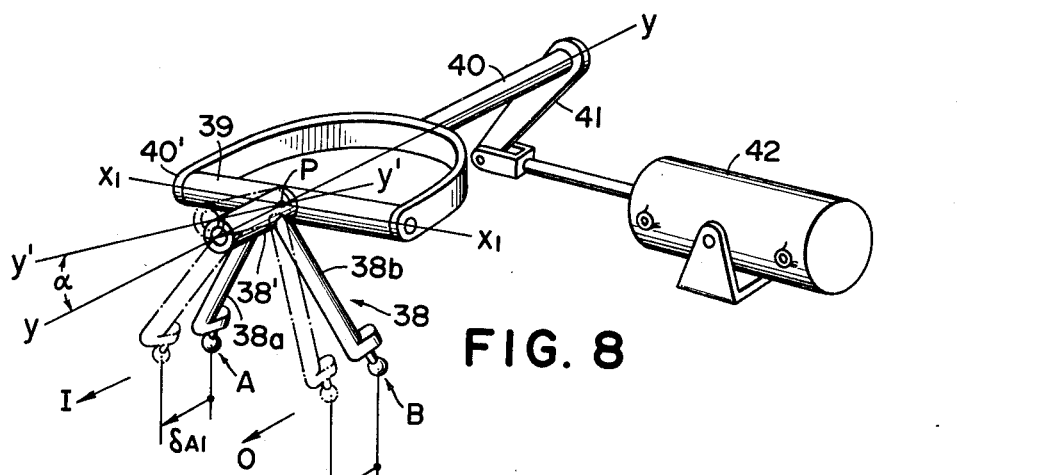
FIG. 8 is a perspective view showing an embodiment of the steering switching means.

In FIG. 8, there is shown a lever mechanism which constitutes the switching mechanism. The lever mechanism includes a V-shaped lever 38 having an input arm 38a, an output arm 38b and a tubular boss 38' between the arms. The input arm 38a has an input end A while the output arm 38b has an output end B. The boss 38' is connected with a shaft 39 which is supported for rotation about an axis $X_1$—$X_1$ by a bifurcated portion 40' of a switching shaft 40. The boss 38' is rotatable with respect to the shaft 39 about an axis Y—Y which intersects the axis $X_1$—$X_1$ at a point P. The switching shaft 40 has an arm 41 which is secured thereto and connected with a switching pneumatic cylinder 42.

Figure 9:
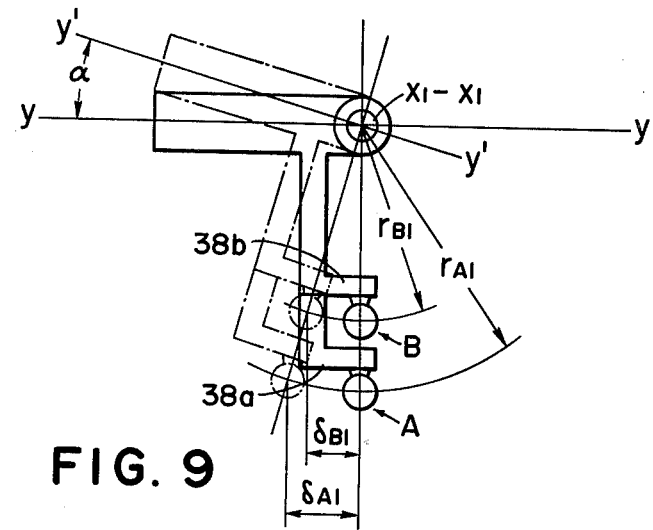
FIG. 9 is an end view of the switching means.

In FIG. 8, the cylinder 42 is shown in the extended position. In this position, as shown in FIG. 9, the arms 38a and 38b are in the same side with respect to axis $X_1$—$X_1$ so that, when the input I is applied to the input end A of the arm 38a to produce a displacement, $\delta A_1$, the lever 38 and the shaft 39 are rotated as a unit about the axis $X_1$—$X_1$ by an angle $\alpha$ producing an output displacement $\delta B_1$ at the output end B of the arm 38b. The lever ratio in this instance is $\delta B_1/\delta A_1$ or $rB_1/rA_1$, where $rA_1$ is the radius of rotation of the input end A and $rB_1$ the radius of rotation of the output end B.

Figure 10:
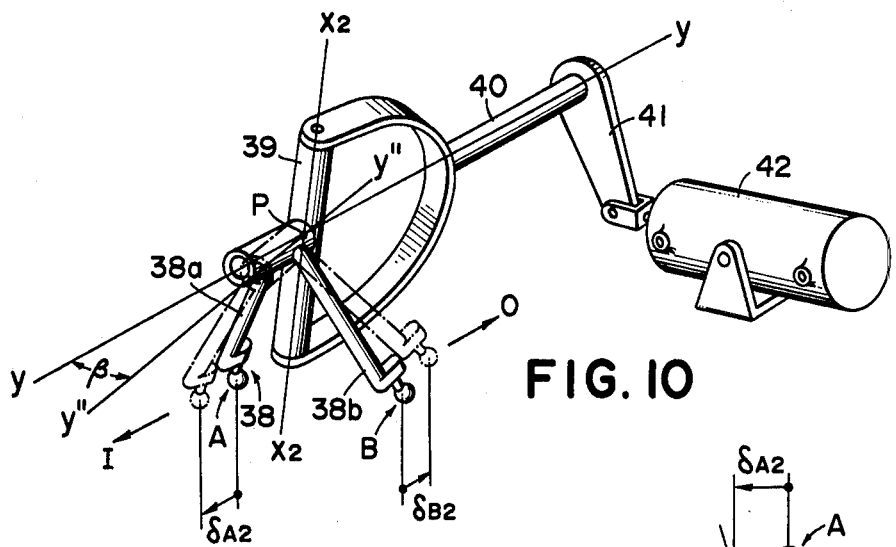
FIG. 10 is a perspective view similar to FIG. 8 but showing the switching means in switched position.
Figure 11:
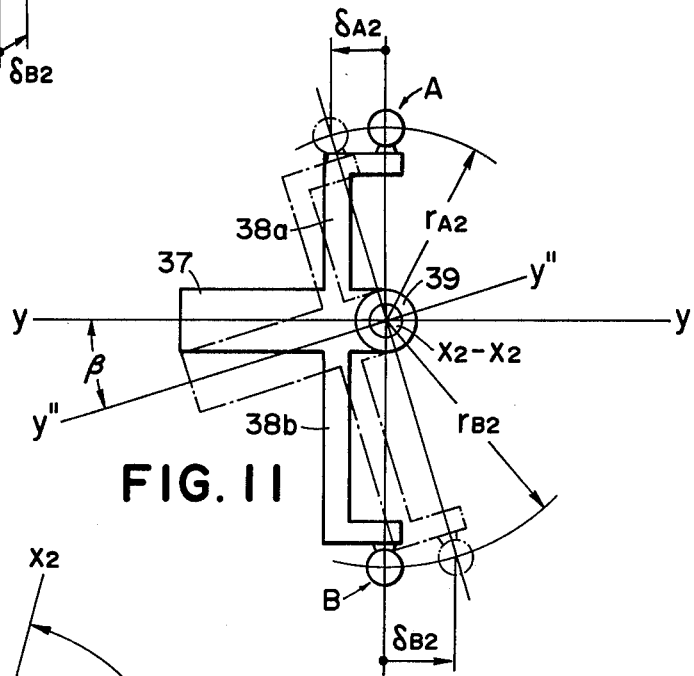
FIG. 11 is an end view of the switching means in the position shown in FIG. 10.

FIG. 10 shows the switching mechanism in the switched position wherein the piston rod of the cylinder 42 is retracted. The axis of the shaft 39 is therefore turned to the position as shown by $X_2$—$X_2$. In this position, the arms 38a and 38b are at the opposite sides of the axis $X_2$—$X_2$ as shown in FIG. 11. It will therefore be understood that, when the input I is applied to the input end A of the arm 38a to produce a displacement $\delta A_2$, the axis Y—Y is turned by an angle $\beta$ as shown by Y"—Y" and the output end B of the arm 38b is therefore displaced in the opposite direction by a distance $\delta B_2$. In this instance, the lever ratio is $\delta B_2/\delta A_2$ or $rB_2/rA_2$ where $rA_2$ is the radius of rotation of the input end A and $rB_2$ the radius of rotation of the output end B.

Figure 12:
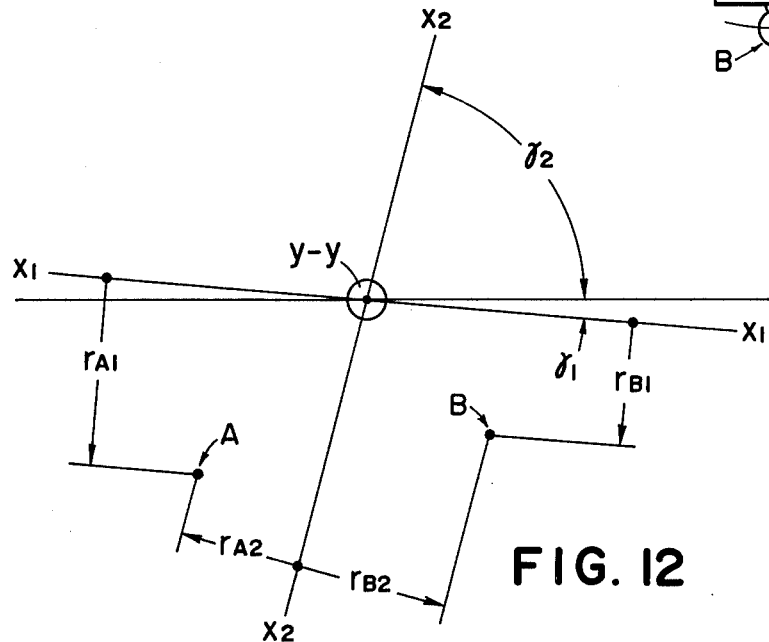
FIG. 12 is a schematic illustration of the switching means showing the principle of the operation.

FIG. 12 shows the switching mechanism as seen in the direction of the axis Y—Y. When the axis of the shaft 39 is in the position $X_1$—$X_1$, the input end A and the output end B are at the same side with respect to the axis $X_1$—$X_1$ with radius of rotation of $rA_1$ and $rB_1$, respectively. Thus, the input end A and the output end B are moved in the same direction, the lever ratio being $rB_1/rA_1$. When the axis of the shaft 39 is rotated to the position $X_2$—$X_2$, the ends A and B are located at the opposite sides with respect to the axis $X_2$—$X_2$. The ends A and B are therefore displaced in the opposite directions with the lever ratio of $rB_2/rA_2$. It will be understood in FIG. 12 that the lever ratio $rB_1/rB_2$ can be determined by the angle $r_1$ which is an angle between a horizontal line and the axis $X_1$—$X_1$. The lever ratio $rB_2/rA_2$ can be determined by the angle $\gamma_2 \gamma$ which is an angle between the horizontal line and the axis $X_2$—$X_2$.

Figure 13:
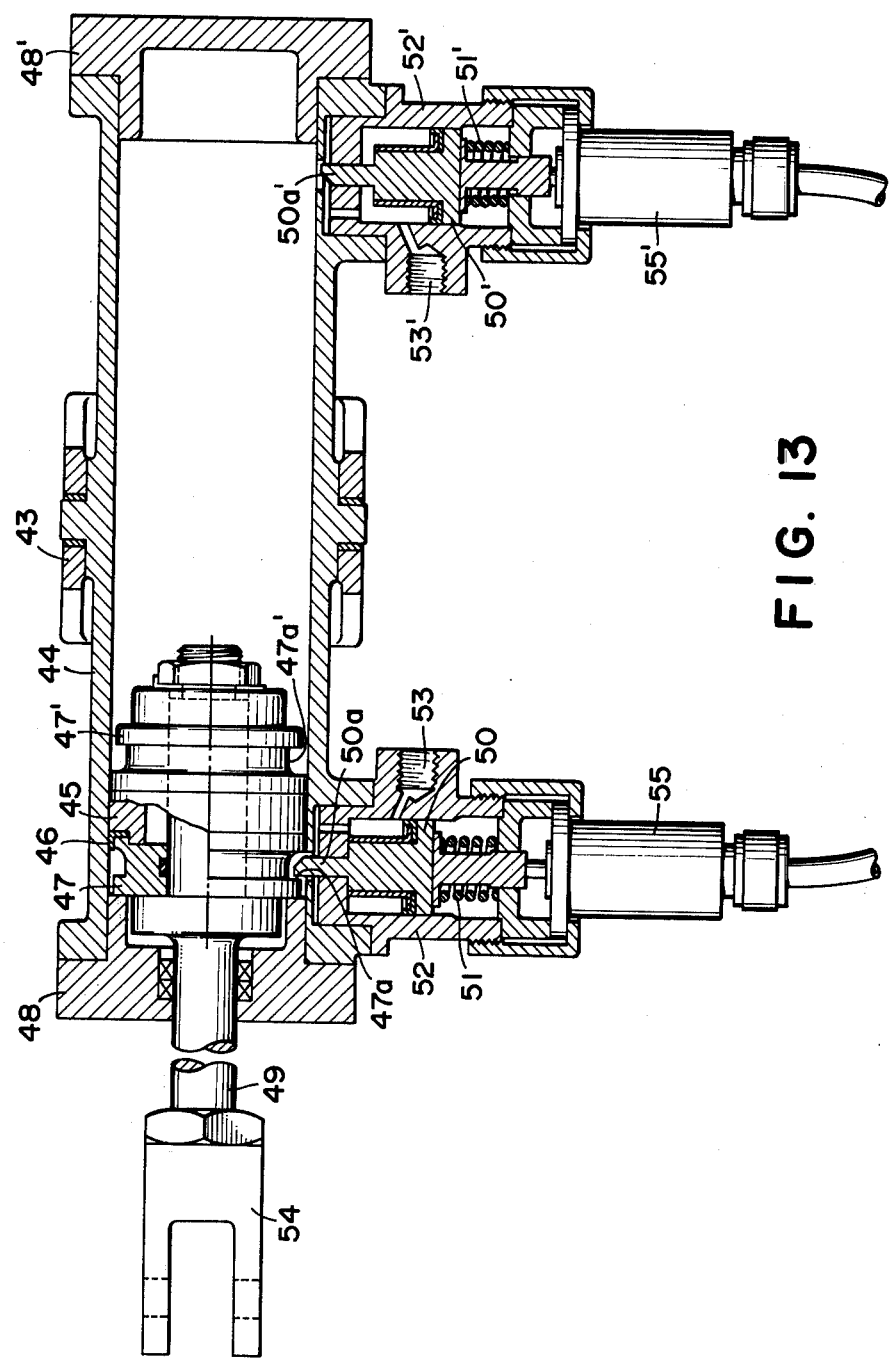
FIG. 13 is a sectional view showing an example of a lockable pneumatic cylinder for effecting the switching operation.

FIG. 13 shows an example of the pneumatic cylinder assembly adapted to be used in the switching mechanism. The assembly includes a cylinder 44 which is supported at the intermediate portion by a trunnion 43. A piston 45 is disposed in the cylinder 44 for slidable movement. The piston 45 carries a piston packing 46 which is retained thereon by retaining rings 47 and 47'. The retaining rings 47 and 47' are formed at the outer peripheries with locking grooves 47a and 47a', respectively. The opposite ends of the cylinder 44 are closed by end caps 48 and 48' and the piston 45 has a piston rod 49 which extends through the end cap 48.

At one end portion of the cylinder 44, there is provided a locking cylinder 52 which is disposed perpendicularly to the cylinder 44. Within the locking cylinder 52, there is disposed a locking piston 50 which has a locking pin 50a extending axially from one end thereof. A spring 51 is provided in the cylinder 52 so as to bias the locking piston 50 in a direction in which the locking pin 50a is projected. When the piston 45 is at the end of the cylinder where the locking cylinder 52 is provided, the locking pin 50a of the piston 50 engages the locking groove 47a so as to lock the piston 45 in position.

The cylinder 52 has a port 53 for supplying compressed air so that the piston 50 is retracted against the action of the spring 51. In the illustrated mechanism, as soon as the locking pin 50a is retracted, a passage is completed to admit the compressed air in the cylinder 52 to the cylinder 44 so as to move the piston 45 toward right. Similar locking mechanism is provided at the other end of the cylinder 44 and corresponding parts are designated by the same reference numerals as in the previously described locking mechanism with addition of primes.

As the piston 45 is moved toward right as described above and reaches the right end portion of the cylinder 44, the locking pin 50a' is moved into engagement under the influence of the spring 51' with the locking groove 47a in the retaining ring 47' so that the piston 45 is locked in position. The piston 45 can be moved toward left in a similar way simply by exhausting compressed air through the port 53 in the cylinder 52 and supplying compressed air to the port 53' of the cylinder 52'.

The piston rod 49 is provided at the free end thereof with a bifurcated fitting 54 which is connected with the arm 41 on the switching shaft 40. The cylinders 52 and 52' may be provided with limit switches 55 and 55' for detecting the operation of the locking mechanism.

Figure 14:
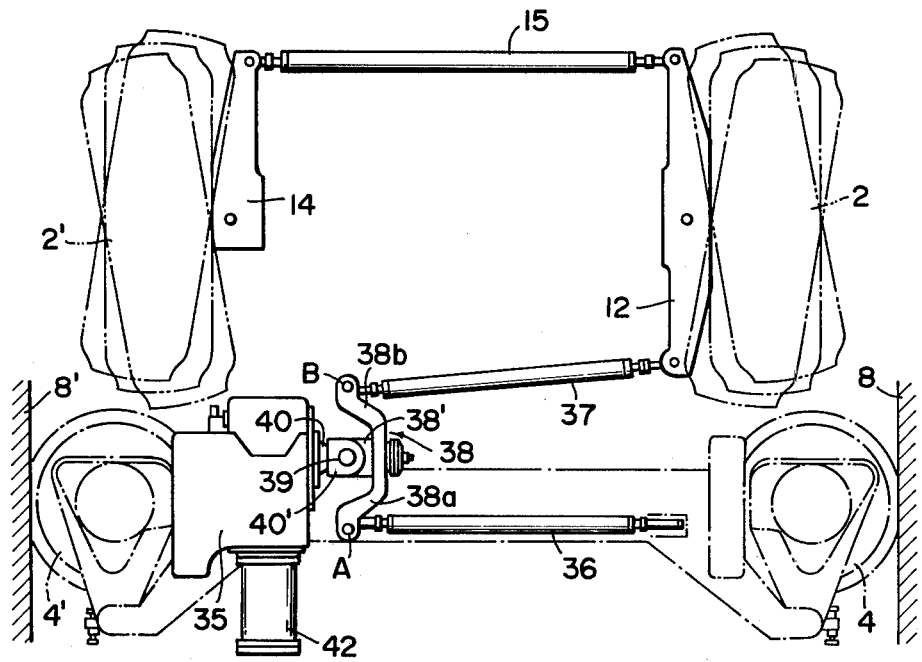
FIG. 14 is a plan view showing specific structure of the steering mechanism in accordance with the present invention.
Figure 15:
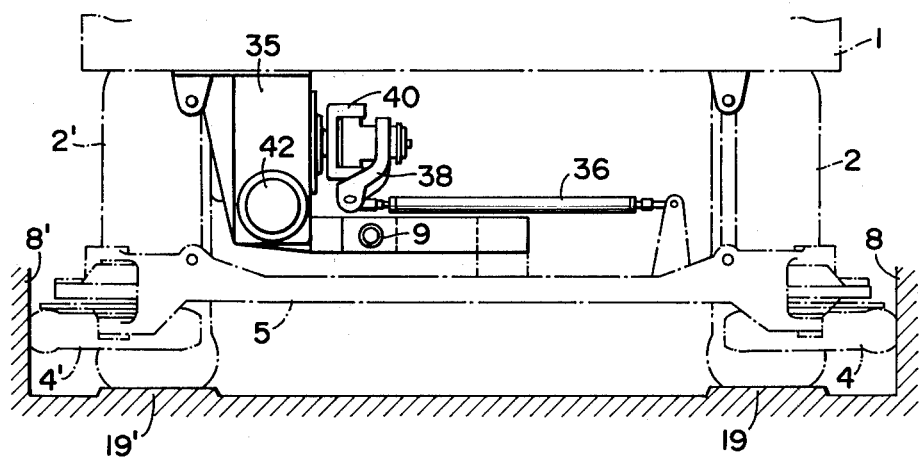
FIG. 15 is a front view of the steering mechanism shown in FIG. 14.

FIGS. 14 and 15 show an embodiment of the switching mechanism in accordance with the present invention. The switching mechanism 35 includes a double-acting lockable air cylinder assembly 42 for rotating a switching shaft 40 which has a bifurcated portion 40' at one end thereof. A shaft 39 is mounted on the bifurcated portion 40' of the switching shaft 40 in the previously described manner. A V-shaped lever 38 is connected through a boss 38' with the shaft 39 and has input and output arms 38a and 38b, respectively. The arms 38a and 38b resepctively have input and output ends A and B to which steering rods 36 and 37 are respectively connected. The restraining mechanism 9 is connected at one end with the casing of the switching mechanism and at the other end with the guide wheel beam 5.

Figure 16:
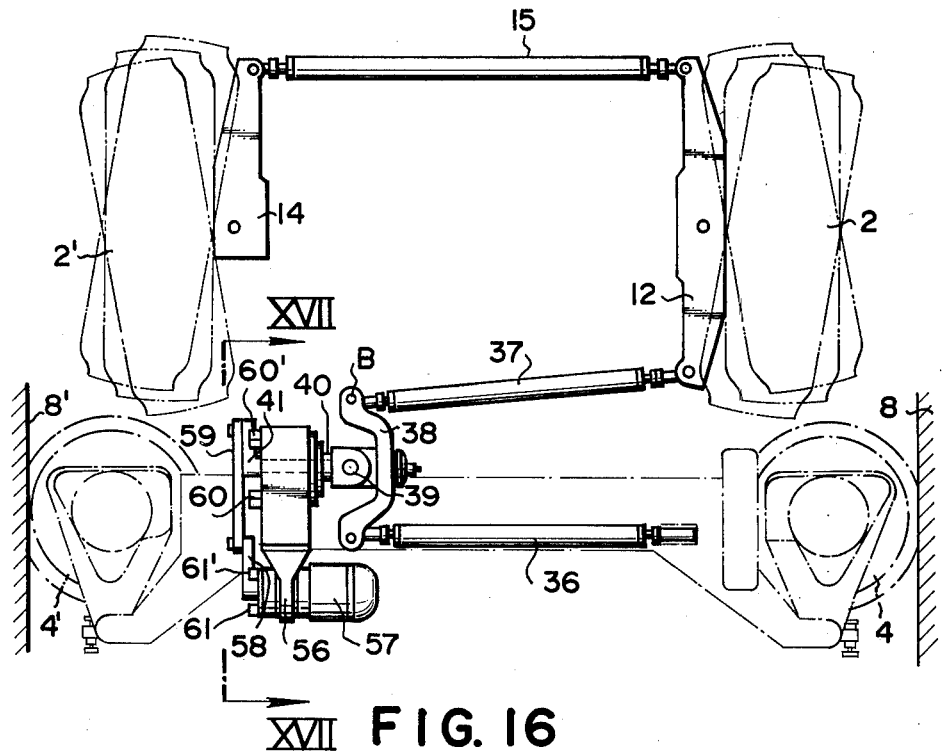
FIG. 16 is a view similar to FIG. 14 but showing another embodiment of the present invention.
Figure 17:
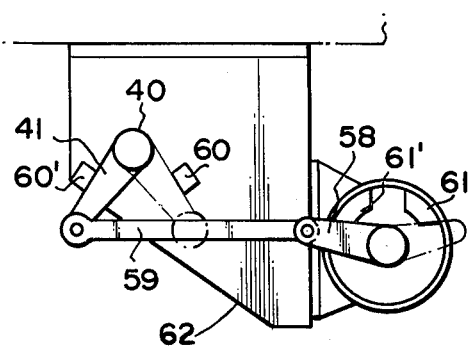
FIG. 17 is a view as seen in the direction of the arrow XVII—XVII in FIG. 16.

Referring to FIGS. 16 and 17, an electric motor 57 having a planetary gear type speed reduction gear unit 56 is connected with an arm 58 which is in turn connected through a link 59 with an arm 41 of the switching shaft 40. A bracket 62 supporting the shaft 40 and the motor 57 has stoppers 60 and 60' which cooperate with the arm 41 for determining the stroke of the arm 41. The case of the gear unit 56 has stoppers 61 and 61' which cooperate with the arm 58. In one position of the arm 41, it engages with the stopper 60 as shown by broken lines. In this instance, the arm 58 engages with the stopper 61. At the other end of the stroke, the arms 41 and 58 engage the stoppers 60' and 61', respectively as shown by solid lines. The lever mechanism is such that the arm 58 engages with the stopper 61 or 61' at an overcenter position wherein a compressive force in the link 59 functions to force the arm toward the stopper to provide a positive locking effect.

The invention has thus been shown and described with reference to specific embodiments, however, it should be noted that the invention is in no way limited to the details of the illustrated structures but changes and modifications may be made without departing from the scope of the appended claims.

I claim:

1. Guided vehicle for use with combined guide rail means and running track means comprising a vehicle body, steerable running wheel means provided at each end portion of said vehicle body adapted to run on running track means, guide wheel means adapted to run along the guide rail means, the guide rail means being provided at opposite sides of the running track means, said guide wheel means being comprised of deformable tire means and movable with respect to said vehicle body in transverse direction of the body, steering linkage means connecting said guide wheel means with said running wheel means so that a transverse movement of the guide wheel means produces a steering movement of the running wheel means, restraining means comprised of friction means for providing a frictional resistance to the linkage means associated with the steering linkage means for applying a restraining force to the linkage means so that the steering movement is not produced in the running wheel means until steering force applied by the guide wheel means exceeds a predetermined value.

2. Vehicle in accordance with claim 1 which is movable in forward and rearward directions, and in which switching means is provided in said steering linkage means for reversing the direction of the steering movement of the running wheel means with respect to the direction of the transverse movement of the guide wheel means.

3. Vehicle in accordance with claim 2 in which said switching means comprises lever means including input and output arm means respectively having input and output portions, said lever means being mounted at a point offset from a line passing through the input and output portions on shaft means for rotation about a first axis which is substantially parallel with the direction of input to the input portion, said shaft means being rotatable about a second axis which is substantially perpendicular to the first axis, means for turning the shaft means so that the second axis is turned between a first position wherein the input and output portions on the lever means are located at the same side of the second axis as seen in the direction of the first axis and a second position wherein the input and output portions are at the opposite sides of the second axis as seen in the direction of the first axis.

4. Vehicle in accordance with claim 3 in which said turning means includes yieldable actuator means.

5. Vehicle in accordance with claim 4 in which said actuator means is pneumatic actuator means.

6. Vehicle in accordance with claim 5 in which said pneumatic actuator means includes locking means.

7. Vehicle in accordance with claim 4 in which said actuator means is electric motor means.

8. Vehicle in accordance with claim 1, wherein said guide wheel means includes a transversely extending beam supporting said deformable tire means, wherein said restraining means includes a slidable plate extending between said transversely extending beam and said friction means, and wherein said steering linkage means includes a steering linkage interconnecting said running wheel means and a steering rod having one end connected to said transversely extending beam and one end connected to a part of said steering linkage.

9. Vehicle is accordance with claim 8, wherein said friction means comprises friction pads positioned on opposite sides of said slidable plate, and means for connecting said friction pads to said vehicle body in such manner that said pads grip said slidable plate therebetween.

10. Vehicle in accordance with claim 9, further comprising biasing means for urging said friction pads into engagement with surfaces of said slidable plate so that said friction means provides frictional resistance to movement of the linkage means in all positions of the linkage means.

11. Vehicle in accordance with claim 1, wherein the relationship between said guide wheel means and said steering linkage means is such that a smaller steering force is required to maintain a steering movment than to initiate a steering movement so that said tire means are deformable during a steering movement to absorb surface irregularities encountered buring movement along the guide rail means.

* * * * *